United States Patent
Rude et al.

(10) Patent No.: US 9,208,624 B2
(45) Date of Patent: Dec. 8, 2015

(54) TIME WINDOW AUTHENTICATION FOR VEHICLE TELEMATICS DEVICE

(71) Applicant: Zubie, Inc., Bloomington, MN (US)

(72) Inventors: Michael John Rude, Excelsior, MN (US); Ari Abram Silkey, Burnsville, MN (US)

(73) Assignee: Zubie, Inc., Bloomington, MN (US)

(*) Notice: Subject to any disclaimer, the term of this patent is extended or adjusted under 35 U.S.C. 154(b) by 83 days.

(21) Appl. No.: 14/105,831

(22) Filed: Dec. 13, 2013

(65) Prior Publication Data

US 2014/0172229 A1 Jun. 19, 2014

Related U.S. Application Data

(60) Provisional application No. 61/737,300, filed on Dec. 14, 2012.

(51) Int. Cl.
- *G07C 5/00* (2006.01)
- *H04L 29/06* (2006.01)
- *H04L 29/08* (2006.01)

(52) U.S. Cl.
CPC .............. *G07C 5/008* (2013.01); *H04L 63/08* (2013.01); *H04L 63/0876* (2013.01); *H04L 67/12* (2013.01); *H04L 69/28* (2013.01)

(58) Field of Classification Search
CPC ..... H04L 63/08; H04L 63/0876; H04L 67/12; H04L 69/28; G07C 5/008
See application file for complete search history.

(56) References Cited

U.S. PATENT DOCUMENTS

| | | | |
|---|---|---|---|
| 5,430,432 A | 7/1995 | Camhi et al. | |
| 5,465,079 A | 11/1995 | Bouchard et al. | |
| 5,499,182 A | 3/1996 | Ousborne | |
| 5,797,134 A | 8/1998 | McMillan et al. | |
| 6,064,970 A | 5/2000 | McMillan et al. | |
| 6,594,579 B1 | 7/2003 | Lowrey et al. | |
| 6,636,790 B1 | 10/2003 | Lightner et al. | |
| 6,714,894 B1 | 3/2004 | Tobey et al. | |
| 6,732,031 B1 | 5/2004 | Lightner et al. | |
| 6,868,386 B1 | 3/2005 | Henderson et al. | |
| 7,124,088 B2 | 10/2006 | Bauer et al. | |

(Continued)

FOREIGN PATENT DOCUMENTS

JP H4182868 6/1992

OTHER PUBLICATIONS

"Claims for Examiner_s Amendment"; authored by: Aaron Penderson; recieved on: Sep. 11, 2015.*

(Continued)

*Primary Examiner* — James Trammell
*Assistant Examiner* — James E Stroud
(74) *Attorney, Agent, or Firm* — Fogg & Powers LLC

(57) ABSTRACT

One embodiment is directed to a method of authenticating a vehicle telematics device. The method includes receiving, at a server, identifying information for a vehicle telematics device and receiving, at the server, information identifying an account to which the vehicle telematics device is to be associated. The method also includes authenticating the vehicle telematics device by finalizing an association between the vehicle telematics device and the account if data that is specified for authentication is received at the server from the vehicle telematics device and if that data is obtained by the vehicle telematics device within a time window that is specified for authentication.

20 Claims, 4 Drawing Sheets

(56) References Cited

U.S. PATENT DOCUMENTS

| | | | |
|---|---|---|---|
| 7,877,269 B2 | 1/2011 | Bauer et al. | |
| 8,090,598 B2 | 1/2012 | Bauer et al. | |
| 8,140,358 B1 | 3/2012 | Ling et al. | |
| 2007/0087756 A1* | 4/2007 | Hoffberg | 455/450 |
| 2010/0014415 A1* | 1/2010 | Moeller | 370/216 |
| 2010/0057485 A1* | 3/2010 | Luft | 705/1 |
| 2011/0196571 A1 | 8/2011 | Foladare et al. | |
| 2011/0250933 A1* | 10/2011 | Wuergler et al. | 455/569.2 |
| 2012/0004933 A1 | 1/2012 | Foladare et al. | |
| 2012/0010906 A1 | 1/2012 | Foladare et al. | |
| 2012/0209634 A1 | 8/2012 | Ling et al. | |
| 2012/0313771 A1 | 12/2012 | Wittliff, III | |
| 2015/0026047 A1* | 1/2015 | Johnson, Jr. | 705/39 |

OTHER PUBLICATIONS

Rude et al., "Methods and Systems for Consumer Controlled Insurance Data Management", "U.S. Appl. No. 13/972,400", Aug. 21, 2013, pp. 1-25.

Rude et al., "Methods and Systems for Vehicle Valuation From OBD Based Operational Data", "U.S. Appl. No. 13/972,428", Aug. 21, 2013, pp. 1-18.

Rude et al., "Methods and Systems for Brokering Insurance", "U.S. Appl. No. 61/691,987", Aug. 22, 2012, pp. 1-19.

Rude et al., "Methods and Systems for Vehicle Valuation From OBD Based Operation Data", "U.S. Appl. No. 61/749,620", Jan. 7, 2013, pp. 1-14.

* cited by examiner

TIME WINDOW AUTHENTICATION FOR VEHICLE TELEMATICS DEVICE

CROSS-REFERENCE TO RELATED APPLICATIONS

This application claims the benefit of U.S. Provisional Patent Application Ser. No. 61/737,300, filed on Dec. 14, 2012, which is hereby incorporated herein by reference.

BACKGROUND

Aftermarket vehicle telematics devices are devices that can be installed within a vehicle and used to monitor information regarding operation of the vehicle. Vehicle telematics devices are used to collect data for many different purposes, such as for fleet management and usage based insurance. As such, vehicle telematics devices can collect many different types of data such as, but not limited to, vehicle operating characteristics (e.g., fuel level, speed, brake application, RPM), location, and temperature. Many vehicle telematics devices connect to an on-board diagnostic (OBD) port of a vehicle to obtain information from the vehicle electronics bus. With a connection to the vehicle electronics bus, the vehicle telematics device can monitor sensors and control components for the vehicle to obtain its operation characteristics.

SUMMARY

One embodiment is directed to a method of authenticating a vehicle telematics device. The method includes receiving, at a server, identifying information for a vehicle telematics device and receiving, at the server, information identifying an account to which the vehicle telematics device is to be associated. The method also includes authenticating the vehicle telematics device by finalizing an association between the vehicle telematics device and the account if data that is specified for authentication is received at the server from the vehicle telematics device and if that data is obtained by the vehicle telematics device within a time window that is specified for authentication.

DRAWINGS

DETAILED DESCRIPTION

The subject matter described herein pertains to authentication of an aftermarket vehicle telematics device that connects to an OBD port of a vehicle. As described in an example herein, authentication of the vehicle telematics device involves causing the vehicle telematics device to monitor data while installed in a vehicle during a specified time window.

Figure 1:
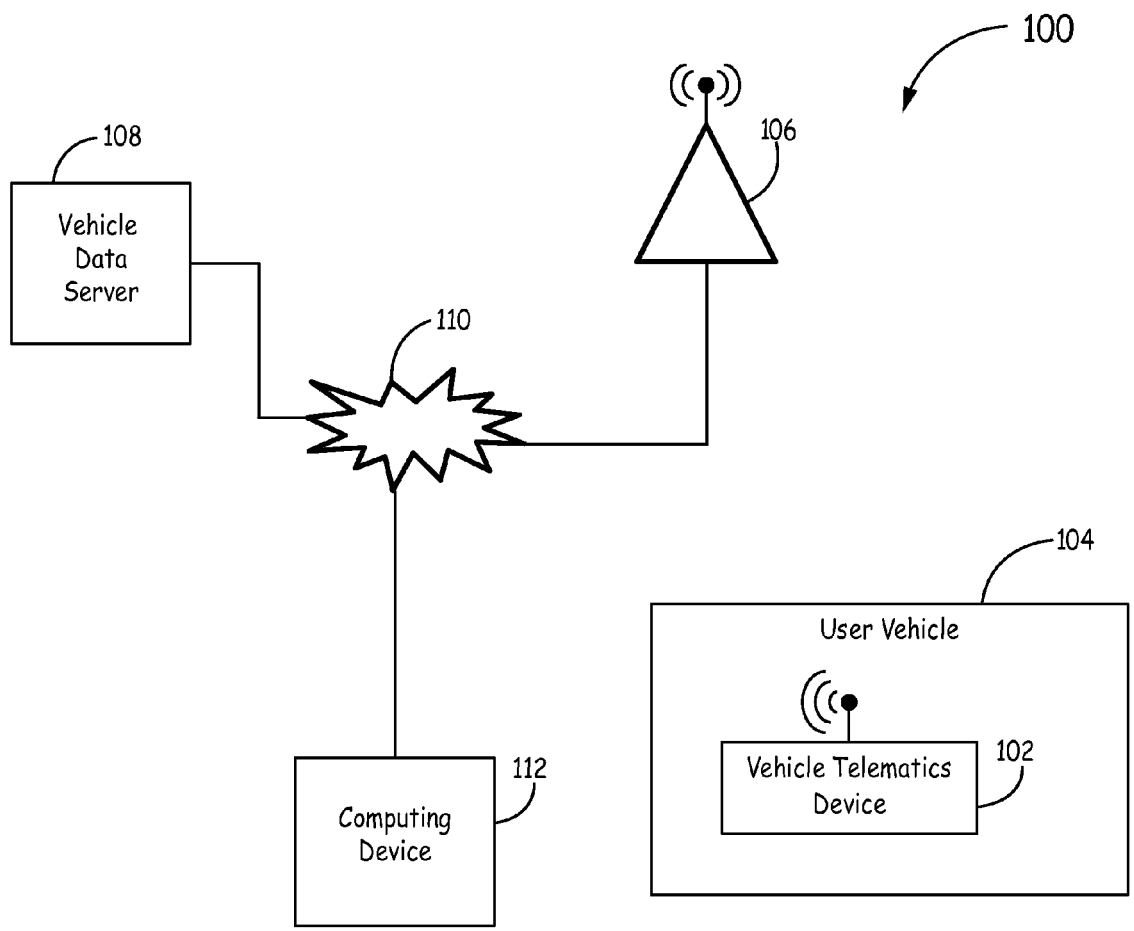
FIG. 1 is a block diagram of an example system including a vehicle telematics device and a vehicle data server including an account corresponding to the vehicle telematics device.

FIG. 1 is a block diagram of an example system 100 including a vehicle telematics device 102. The vehicle telematics device 102 is a device configured to be physically installed in a vehicle 104, such as by connecting the vehicle telematics device 102 to an OBD port of the vehicle 104. The vehicle telematics device 102 monitors information regarding operation of the vehicle 104.

The vehicle telematics device 102 is configured to send data (e.g., vehicle information) obtained or otherwise generated to a server 108. The server 108 can store and/or analyze the data to achieve the intended purpose for the data. The communication of the data from the vehicle telematics device 102 to the server 108 can take any suitable form. For example, the vehicle telematics device 102 can be configured to wirelessly communicate with a cellular tower 106 which is coupled to a network 110 such as the internet. The server 108 can also be communicatively coupled to the network 110 such that the vehicle telematics device 102 can send the data to the tower 106 through the network 110 and to the server 108. In another example, the vehicle telematics device 102 is configured to communicate with a local area network using, for example, WiFi, which in turn is coupled to the network 110. In yet another example, the vehicle telematics device 102 is configured to communicate with a personal computing device 112 (e.g., via USB) that can be coupled to the network 110 and relay the data from the vehicle telematics device 102 to the server 108. In such an example, the vehicle telematics device 102 could be disconnected from the OBD port of the vehicle 104 and coupled to the personal computing device 112 (e.g., via USB).

The vehicle telematics device 102 can be configured to upload the data to the server 108 on a real-time, period, or on-demand basis. For example, in implementations when the vehicle telematics device 102 is capable of communicating with a cellular tower 106, the data can be uploaded to the server 108 in real-time whenever a cellular tower 106 is within range. In other examples, the vehicle telematics device 102 can buffer data and periodically upload (e.g., via the cellular tower 106). In yet other examples, such as when the vehicle telematics device 102 communicates by connecting to a personal computer 112, the vehicle telematics device 102 can provide the data in response to a command initiated by the user.

The vehicle telematics device 102 may be obtained by a user via a provider of services corresponding to the vehicle telematics device 102 or via a retail outlet. Once obtained, the user can install the vehicle telematics device 102 in the vehicle 104, such as by connecting the vehicle telematics device 102 to an OBD connector of the vehicle 104. After installation in the vehicle 104 (e.g., after connecting with the OBD connector of the vehicle 104) the vehicle telematics device 102 can initiate operation.

To make use of the data, the vehicle telematics device 102 (i.e., the data therefrom) is associated with an account (e.g., a user account) at the server 108. The vehicle telematics device 102 can be associated with an account by providing identifying information (e.g., a serial number) for the vehicle telematics device 102 to the server 108 and providing an indication as to which account the identifying information is to be associated. Providing the identifying information for the vehicle telematics device 102 to the server 108 and providing an indication as to which account the identifying information is to be associated can be done in any suitable form. Typically, the identifying information and the indication as to which account are provided by a (future) user of the vehicle telematics device 102, such as by communication with the server 108 via a computing device 112 or by telephone. The account can be an account that is created at that time by the user or an account that already exists.

Once the identifying information and its corresponding account have been identified to the server 108, the server 108 waits for authentication of the vehicle telematics device 102 before finalizing the association between the vehicle telematics device 102 and the account. Authentication can be used to ensure that the vehicle telematics device 102 is associated with the proper account. For example, without authentication it may be easier for a hacker to gain access to a user's account and/or to gain access to information from a user's vehicle telematics device 102. Such a hacker may be able to gain such access by posing as a real user and associating the identifying information from a given vehicle telematics device 102 with an unintended account. The subject matter herein addresses such concerns by providing authentication measures for the vehicle telematics device 102. A hacker refers to a person having knowledge of the identifying information (i.e., not the intended user), but not actually possessing the vehicle telematics device 102 itself.

To authenticate the vehicle telematics device 102 and ensure that the user that provided the identifying information and its corresponding account actually possess the vehicle telematics device 102, the server 108 requires that one or more actions be performed with the vehicle telematics device 102 within a time window provided by the server 108. The action(s) to be performed and time window can be selected in any suitable manner such as, for example, being based on an activity that is unlikely to occur otherwise, and/or an activity that is easy for the user to perform.

In an example, the action(s) to be performed includes monitoring of vehicle data generated by sensors and/or control components over the OBD port with the vehicle telematics device 102. In examples where the vehicle telematics device 102 can communicate with a cellular tower 106, monitoring of the vehicle data with the vehicle telematics device 102 within the specified time window can be verified based on when vehicle data is received at the server 108 from the vehicle telematics device 102. For example, the vehicle telematics device 102 can be configured to transmit vehicle data to the server 108 via the cellular tower 108 as soon as a connection with a cellular tower 106 is established after the vehicle telematics device 102 is physically installed in a vehicle 104. In most instances, this will enable the server 108 to receive data shortly after the vehicle telematics device 102 is installed. Thus, with a sufficiently large time window (e.g., 4 hours), there is a high likelihood that if a user installs and activates the vehicle telematics device 102 (possibly also including requiring driving of the vehicle), the server 108 will receive vehicle data within the time window and authenticate the vehicle telematics device 102.

In some examples, the vehicle telematics device 102 can time stamp vehicle data as the vehicle data is obtained by the vehicle telematics device 102 from the sensors and/or control components of the vehicle. In such an example, regardless of when the server 108 receives the vehicle data, the server 108 can verify when the vehicle data was obtained by the vehicle telematics device 102 based on the time stamp corresponding to the vehicle data. If the time stamp of the vehicle data is within the specified time window, the server 108 authenticates the vehicle telematics device 102.

In another example, the one or more actions can include connecting the vehicle telematics device to the OBD port of the vehicle 104. In such an example, the vehicle telematics device 102 can detect whether it is connected to the OBD port of the vehicle 104, and the data indicating that the vehicle telematics device 102 is or has been connected to the OBD port of the vehicle 104 can be sent from the vehicle telematics device 102 to the server 108. The timing for such data can be verified based on when the data is received by the server 108 or based on a time stamp provided by the vehicle telematics device 102 as discussed above. In such an example, all that is required is that the user connect the vehicle telematics device 102 to the OBD port of the vehicle 104 within the time window.

In some examples, the one or more actions can include one or more actions that cause the vehicle telematics device 102 to send a set of data corresponding to a data signature. A data signature, as used herein, is a set of data that is unlikely to occur during normal use of the vehicle telematics device 102. Such an action or set of actions can be selected such that the action or set of actions generates an otherwise unlikely set of vehicle data (data signature) that can be identified by the server 108. The action or set of actions can be one or more actions performed by the user with the vehicle telematics device 102 and/or the vehicle 104 in which the vehicle telematics device 102 is installed. The action or set of actions that are unlikely to occur otherwise can include one or a combination of performing a particular sequence of actions or performing multiple actions contemporaneously. Likewise, the data signature can include one or a combination of an unlikely sequence of vehicle data or two or more items of vehicle data that occur contemporaneously, but would otherwise be unlikely to occur contemporaneously. For example, the vehicle telematics device 102 can include an authenticate button which, when activated by the user, causes the vehicle telematics device 102 to generate and/or upload a data signature that can be identified by the server 108. In another example, the data signature can be generated by having the user, after installing the vehicle telematics device 102, flash the lights on and off in the vehicle 5 times in succession. The vehicle telematics device 102 can be configured to capture such flashing as vehicle data, for example in the normal course of monitoring the vehicle 104, and when the vehicle data is provided to the server 108, the vehicle data indicating that the lights were flashed on and off 5 times in succession can be identified as the data signature. As is evident, in other examples, other action(s) could be performed with the vehicle 104 to generate a data signature. If the server 108 receives such a data signature, the server 108 authenticates the vehicle telematics device 102. The timing for the data signature can be verified based on when the data signature is received by the server 108 or based on a time stamp provided by the vehicle telematics device 102 as discussed above.

In some examples, authentication can be based on information provided to the server 108 by the user that corresponds to (e.g., matches) data provided by the vehicle telematics device 102. For example, the user can provide the server 108 with identifying information (e.g., a VIN) for the vehicle 104 in which the vehicle telematics device 102 is (to be) installed. The vehicle telematics device 102 can be configured to, after being installed in a vehicle, provide identifying information (e.g., a VIN) for the vehicle to the server 108. In another example, the user can provide the server 108 with information indicating a location of the vehicle 104 in which the vehicle telematics device 102 is (to be) installed. The vehicle telematics device 102 can be configured to, after being installed in a vehicle, provide information identifying the location of the vehicle to the server 108. In other examples, other items of information can be used. If the information provided by the vehicle telematics device 102 corresponds to the information provided by the user, the server 108 authenticates the vehicle telematics device 102. The timing for the information can be verified based on when the information is received by the server 108 or based on a time stamp provided by the vehicle telematics device 102 as discussed above.

The time window specified for the action can be any appropriate time window. For example, the time window can be a certain length of time (e.g., 4 hours) after the account is set up on the server 108. In an example account set-up includes, the server 108 receiving identifying information for the vehicle telematics device 102 and its to-be associated account information. In another example, the time window can be a particular time period on a particular day(s), such as, between 8 and 10 pm on the day in which the account is set up on the server 108. Other examples are also possible. In some examples, a computing device 112 used to provide information to the server 108 can display a visual indication, such as a countdown clock, indicating a remaining portion of the time window for the user.

In any case, if the authentication of the vehicle telematics device 102 is successful, the association between the vehicle telematics device 102 and the identified account can be finalized. In an example, finalizing the association between the vehicle telematics device 102 and the identified account can include enabling data from the vehicle telematics device 102 to be associated (e.g., accessed via) the account. In another example, finalizing the association between the vehicle telematics device 102 and the identified account can include enabling the account information to be stored indefinitely (or until manually removed such as during closure of the account). In another example, finalizing the association can also include not discarding the account information after a length of time.

If the authentication of the vehicle telematics device 102 is not successful, the server 108 does not finalize the association between the vehicle telematics device 102 can the association between the vehicle telematics device 102 and the identified account can be discarded. In another example, if the authentication is not successful, the server 108 can disable storing or other processing of vehicle data from the vehicle telematics device 102. Other actions can also be taken in response to one or repeated unsuccessful authentications, such as locking out a particular IP address or vehicle telematics device 102 from the server 108.

Figure 2:
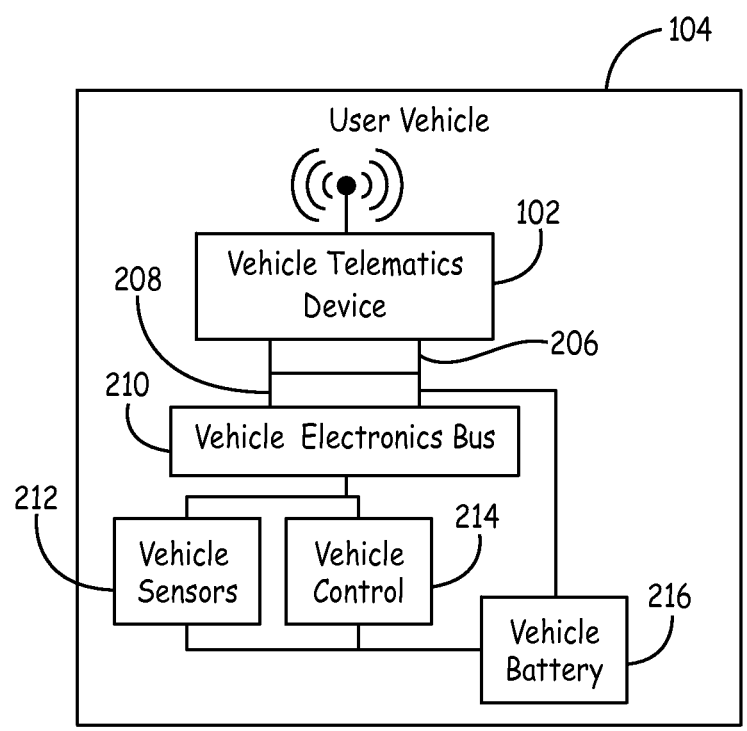
FIG. 2 is a block diagram of an example vehicle including a vehicle information device for use in the system of FIG. 1.

FIG. 2 is a block diagram of an example vehicle 104 including an example vehicle telematics device 102. In the example shown in FIG. 2, the vehicle telematics device 102 is an aftermarket device that is coupled to the vehicle electronics bus 210 through an on-board diagnostics (OBD) port of the vehicle 104.

The vehicle telematics device 102 includes an OBD connector 206 configured to connect to a mating OBD connector 208 on the vehicle 104. The OBD connector 208 on the vehicle 104 is coupled to a vehicle electronics bus 210 over which vehicle sensors 212, vehicle control electronics 214, and other electronics in the vehicle 104 communicate. The vehicle sensors 212 and the vehicle control electronics 214 receive power from a battery 216 in the vehicle 104. As known, this battery 216 can also be the battery that provides power for starting and/or driving the vehicle 104. The battery 216 can also be coupled to a plurality of conductors on the OBD connector 208 of the vehicle 104. These conductors can contact corresponding power conductors on the OBD connector 206 of the vehicle telematics device 102. In this way, the vehicle telematics device 102 can obtain operating power from the battery 216 of the vehicle 104 through the OBD connectors 206, 208. Example OBD connectors 206, 208, include the SAE-J1962 connector, which is the connector for the OBD-II protocol described in the SAE-J1978 standard. The vehicle 104 can include any automobile having an OBD connector 208 including, but not limited to, a car, pick-up, SUV, bus, semi-truck, construction vehicle, or motorcycle.

Although the example of the vehicle information device 104 shown in FIG. 2 and described above is an aftermarket device, in other examples, the vehicle information device 104 is an integrated device coupled to the vehicle electronics bus 210 that functions in a similar manner to that described above.

Figure 3:
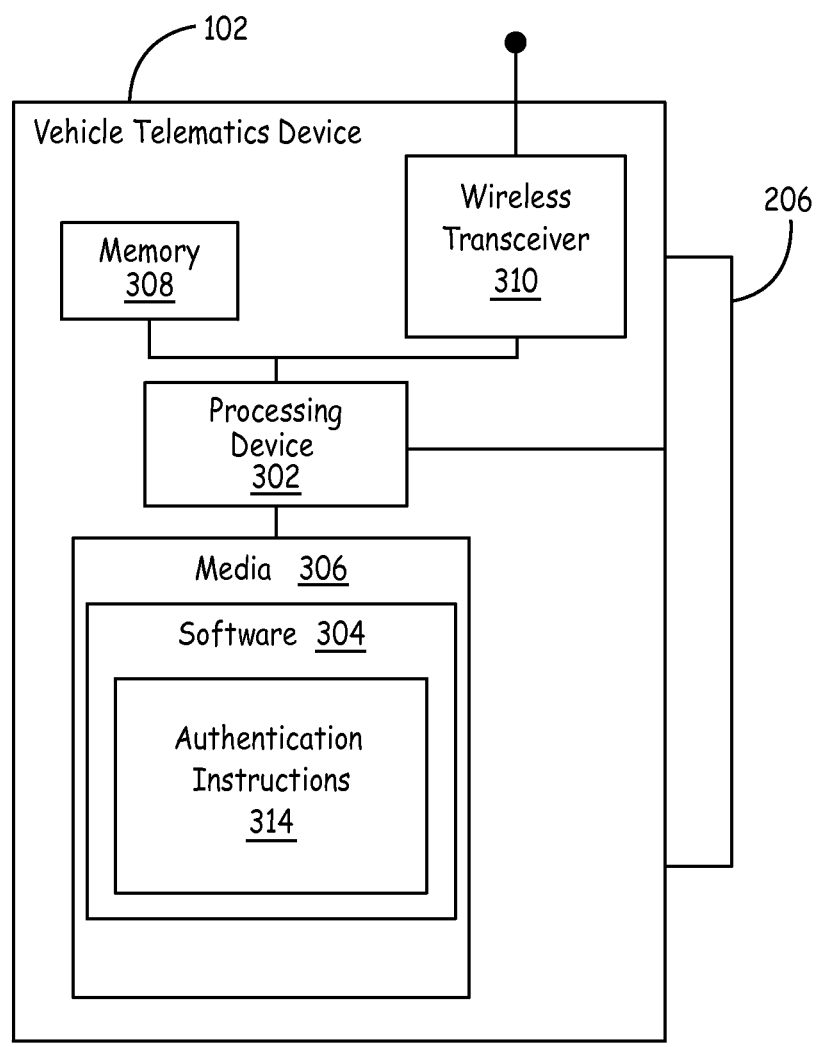
FIG. 3 is a block diagram of an example vehicle information device for use in the system of FIG. 1 and the vehicle of FIG. 2.

FIG. 3 is a block diagram of an example vehicle telematics device 102. The vehicle telematics device 102 can include one or more processing devices 302 for executing instructions 304. The one or more processing devices 302 can include a general purpose processor or a special purpose processor. The instructions 304 are stored (or otherwise embodied) on or in an appropriate storage medium or media 306 (such as flash or other non-volatile memory) from which the instructions 304 are readable by the processing device(s) 302 for execution thereby. The vehicle telematics device 102 also includes memory 308 that is coupled to the processing device(s) 302 for storing instructions (and related data) during execution by the processing device(s) 302. Memory 308 comprises, in one implementation, any suitable form of random access memory (RAM) now known or later developed, such as dynamic random access memory (DRAM). In other implementations, other types of memory are used. The vehicle telematics device 102 also includes the OBD connector 206 discussed above.

The vehicle telematics device 102 can include the electronic components for communication with the appropriate device, such as a wireless transceiver 310 for communication with a cellular tower 106 or a wireless access point, or a transceiver for communication over a wired medium such as a CAT-5 cable or Universal Serial Bus (USB). Wireless communications between the wireless transceiver 310 and other devices can conform to any suitable protocol. For example, wireless communications between the wireless transceiver 310 and a local area networked component can use IEEE 802.11 (WiFi), IEEE 802.14.5 (ZigBee), Bluetooth, a proprietary protocol, or other protocol. Wireless communications between the wireless transceiver 310 and the cellular tower 106 can use 2G (e.g., GPRS), 2.5G, 3G, or 4G (e.g., WiMax, LTE) protocol, or any future protocol.

The instructions 304 on the vehicle telematics device 102 include authentication instructions 314 that are configured to cause the processing device(s) 302 to implement the functions of the vehicle telematics device 102 described herein; in particular to implement the functions to provide the appropriate data to the server 108 such that the vehicle telematics device 102 can be authenticated.

Figure 4:
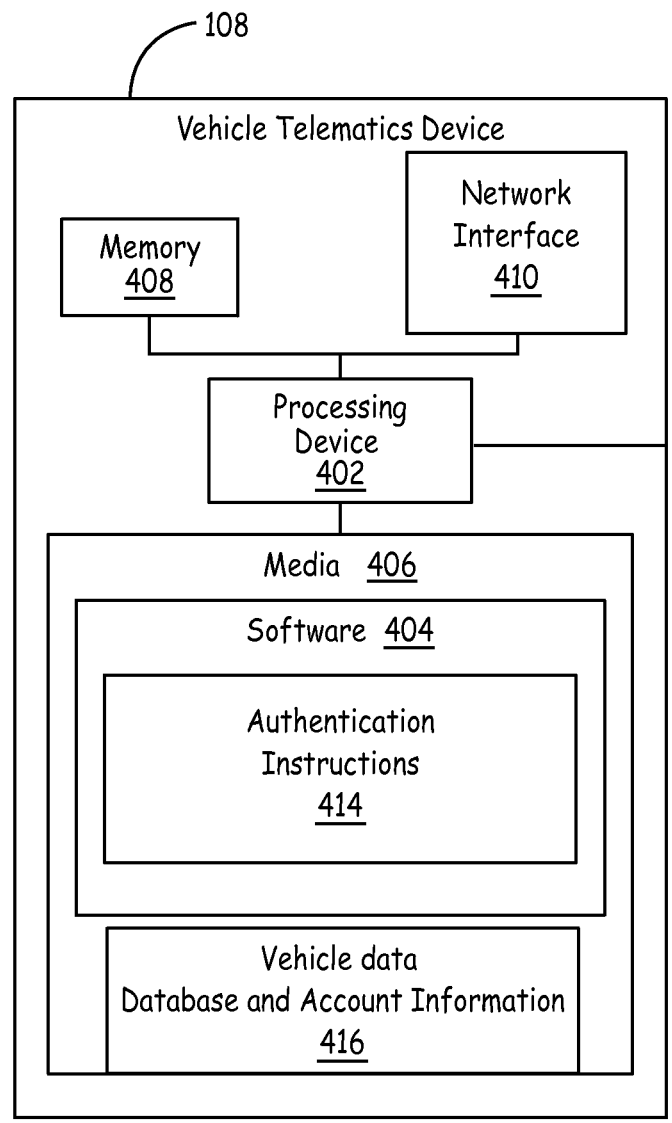
FIG. 4 is a block diagram of an example vehicle data server for use in the system of FIG. 1.

FIG. 4 is a block diagram of an example vehicle data server 108. Server 108 includes one or more processing devices 402 for executing instructions 404. The one or more processing devices 402 can include a general purpose processor or a special purpose processor. The instructions 404 are stored (or otherwise embodied) on or in an appropriate storage medium or media 406 (such as flash or other non-volatile memory) from which the instructions 404 are readable by the processing device(s) 402 for execution thereby. The server 108 also includes memory 408 that is coupled to the processing device(s) 402 for storing instructions (and related data) during execution by the processing device(s) 402. Memory 408 comprises, in one implementation, any suitable form of random access memory (RAM) now known or later developed, such as dynamic random access memory (DRAM). In other implementations, other types of memory are used. The server 108 also includes a network interface 410 for communicatively coupling the server 108 to other devices or networks. The instructions 404 include vehicle telematics device authentication instructions 414 that are configured to cause the processing device(s) 202 to implement the functions of the vehicle data server 108 described above. Also on the media 406 is the vehicle data database or other file structure 416 that includes the vehicle data as well as the user account information such as user identification information, identification information for the vehicle telematics device 102, identification information for the vehicle 104, as well as other information and the association between such account information and the vehicle data from the vehicle telematics device 102. The server 108 include multiple sets of such vehicle data and accounts each corresponding to a different vehicle telematics device 102.

What is claimed is:

1. A method of authenticating a vehicle telematics device, the method comprising: receiving, at a server, identifying information for a vehicle telematics device, the vehicle telematics device configured to connect to an on-board diagnostics (OBD) port of a vehicle and obtain vehicle data corresponding to the vehicle through the OBD port; receiving, at the server, information identifying an account to which the vehicle telematics device is to be associated; and authenticating the vehicle telematics device by finalizing an association between the vehicle telematics device and the account if data that is specified for authentication is received at the server from the vehicle telematics device and if that data is obtained by the vehicle telematics device within a time window that is specified for authentication.

2. The method of claim 1, wherein if data that is specified for authentication is not received at the server from the vehicle telematics device or if data that is specified for authentication is not obtained by the vehicle telematics device within a time window that is specified for authentication, discarding the association between the vehicle telematics device and the account.

3. The method of claim 1, wherein the data that is specified for authentication corresponds to one or more actions performed by a user.

4. The method of claim 3, wherein the data that is specified for authentication includes vehicle data generated by sensors or control components obtained by the vehicle telematics device over an on-board diagnostics (OBD) port of a vehicle.

5. The method of claim 3, wherein the data that is specified for authentication includes data corresponding to a data signature generated by one or more actions.

6. The method of claim 3, wherein the data that is specified for authentication includes data indicating that the vehicle telematics device is or has been connected to an on-board diagnostics (OBD) port of the vehicle.

7. The method of claim 3, wherein the data that is specified for authentication includes data that corresponds to data provided by a user to the server.

8. The method of claim 1, wherein the time window comprises a specified length of time after both the identifying information for a vehicle telematics device and the information identifying an account are received at the server.

9. The method of claim 1, comprising:
verifying, at the server, that data received was obtained within the time window based on when the data was received at the server.

10. The method of claim 1, comprising:
verifying, at the server, that data received was obtained within the time window based on a time stamp for the data provided by the vehicle telematics device.

11. A system for authenticating a vehicle telematics device, the system comprising:
a vehicle telematics device configured to connect to an on-board diagnostics (OBD) port of a vehicle and obtain vehicle data corresponding to the vehicle through the OBD port;
a server configured to:
receive identifying information for the vehicle telematics device, the identifying information received over the internet from a computing device operated by a user;
receive information identifying an account to which the vehicle telematics device is to be associated; and
authenticate the vehicle telematics device by finalizing an association between the vehicle telematics device and the account if data that is specified for authentication is received at the server from the vehicle telematics device and if that data is obtained by the vehicle telematics device within a time window that is specified for authentication.

12. The system of claim 10, wherein the server is configured to discard the association between the vehicle telematics device and the account if data that is specified for authentication is not received at the server from the vehicle telematics device or if data that is specified for authentication is not obtained by the vehicle telematics device within a time window that is specified for authentication.

13. The system of claim 10, wherein the data that is specified for authentication corresponds to one or more actions performed by a user.

14. The system of claim 13, wherein the data that is specified for authentication includes vehicle data generated by sensors or control components obtained by the vehicle telematics device over an on-board diagnostics (OBD) port of a vehicle.

15. The system of claim 13, wherein the data that is specified for authentication includes data corresponding to a data signature generated by one or more actions.

16. The system of claim 13, wherein the data that is specified for authentication includes data indicating that the vehicle telematics device is or has been connected to an on-board diagnostics (OBD) port of the vehicle.

17. The system of claim 13, wherein the data that is specified for authentication includes data that corresponds to data provided by a user to the server.

18. The system of claim 10, comprising:
verifying, at the server, that data received was obtained within the time window based on when the data was received at the server.

19. The system of claim 10, comprising:
verifying, at the server, that data received was obtained within the time window based on a time stamp for the data provided by the vehicle telematics device.

20. A method of authenticating a vehicle telematics device, the method comprising: receiving, at a server, information setting up an account associated with a vehicle telematics device, the vehicle telematics device configured to connect to an on-board diagnostics (OBD) port of a vehicle and obtain vehicle data corresponding to the vehicle through the OBD port, the information received over the internet from a personal computing device; and authenticating the vehicle telematics device by finalizing an association between the vehicle telematics device and the account if data that is specified for authentication is received at the server from the vehicle telematics device and if that data is obtained by the vehicle telematics device within a time window that is specified for authentication.

* * * * *